J. A. H. HATT.
COLOR FILTER.
APPLICATION FILED MAY 3, 1906.
1,013,937.
Patented Jan. 9, 1912.
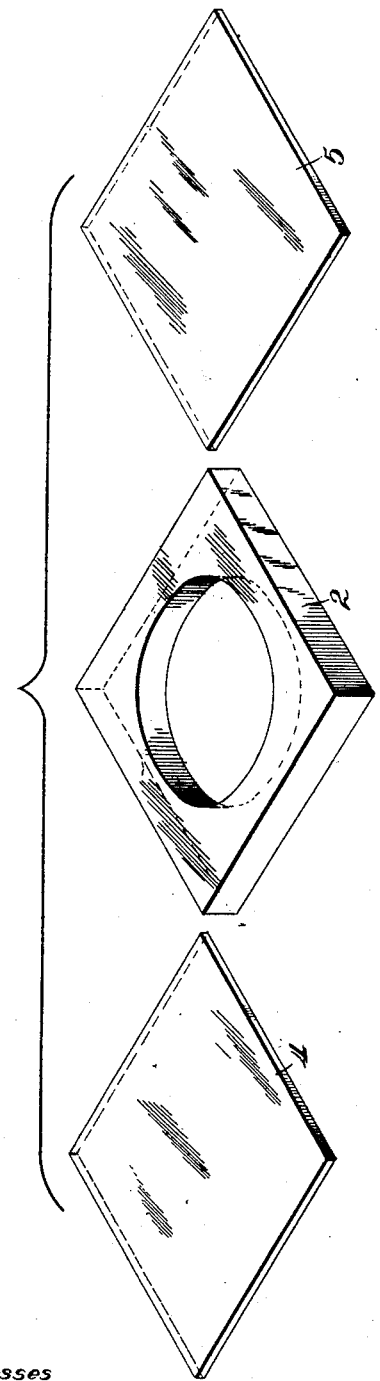
Witnesses
Wilton Lenoir
H. C. Lucas
Inventor
J. Arthur H. Hatt
By John D. Morgan
Attorney.

UNITED STATES PATENT OFFICE.

JOSEPH ARTHUR HENRY HATT, OF BROOKLYN, NEW YORK.

COLOR-FILTER.

1,013,937.  Specification of Letters Patent.  Patented Jan. 9, 1912.

Application filed May 3, 1906. Serial No. 314,944.

*To all whom it may concern:*

Be it known that I, JOSEPH ARTHUR HENRY HATT, a citizen of the United States, residing at Brooklyn, in the county of Queens and State of New York, have invented new and useful Improvements in Color-Filters, of which the following is a specification.

The invention relates to color filters used in photography and more especially to filters which carry a liquid or semi-liquid filtering medium.

Objects of the invention are to provide a filter which is efficient and inexpensive; which is of simple construction, comprising few parts; which has few joints thus minimizing any tendency to leakage or evaporation; and which may be manufactured quickly and expeditiously.

Further objects of the invention are to provide a method for producing such a color filter.

These and other objects of the invention will in part be obvious and will in part appear hereinafter.

The invention consists in the novel parts, articles, improvements and combinations herein described and illustrated.

The accompanying drawings, referred to herein and forming a part hereof, illustrate one embodiment of the invention, the same serving in connection with the description herein, to explain the principles of the invention.

Of the drawings: Figure 1 represents the parts of a color filter constructed in accordance with the invention before they are assembled; Fig. 2 is a transverse sectional elevation showing one form of filter; and Fig. 3 is a similar view showing another form thereof.

In photography generally and especially in process reproduction work, which comprises the principal and most important application of color filters in the art, it is found desirable to use a liquid or semi-liquid filtering medium. With such filtering media, however, it has heretofore been troublesome and expensive to provide a suitable receptacle or carrier for the filtering medium. Where carriers are used consisting of metal and glass, they are expensive and troublesome to manufacture and are to a great degree subject to leakage and evaporation. Color filters having the receptacle or carrier for the filtering medium made entirely of glass are known to the art but the said receptacles are made up of a large number of pieces, involving a close fitting of joints and careful application of a suitable adhesive for holding them together. Such receptacles are also expensive and troublesome to manufacture and are likewise subject to leakage and evaporation by reason of the large number of joints necessary.

The present invention contemplates providing a color filter in which the receptacle for the filtering medium consists of but two or three members. It will be manifest that, by reason of the fewness of the parts and the absence of joints, it will be a simple matter to assemble the parts of the color filter; that there will be but little opportunity for leakage or evaporation; that but little labor will be required to seal the filter against leakage or evaporation; and that the color filter may be quickly and inexpensively manufactured. The invention further contemplates having the parts of such shape that there are no joints in contact with the filtering medium except where extended flat surfaces meet, joints of such character not requiring close fitting and grinding.

Referring to the embodiment illustrated herewith by way of example, it will be seen from Fig. 3 of the drawings that an integral plate 1 of a suitable material, which may be glass, is shown so shaped as to form the entire side walls and one face of the receptacle for the filtering medium $x$. Another form of such plate is shown in Figs. 1 and 2 of the drawings and is indicated by the reference numeral 2. In the form of such plate last mentioned, an internal portion thereof is cut away to form the side walls of the receptacle for the filtering medium. The side walls of the receptacle for the filtering medium in this case also are formed by the integral plate 2. In either case it will be understood that the plate provides an imperforate wall for the receptacle for the filtering medium. With the form shown in Fig. 3 the plate 1 is itself of a light-transmitting material; with the form shown in Figs. 1 and 2, however, the plate 2 may be of any suitable material for holding the liquid or semi-liquid filtering medium. With the form shown in Fig. 3 of the drawings, a light-transmitting plate 3 is used to form a cover for the receptacle after the filtering medium has been placed therein, said light-transmitting plate being usually of glass. With the form shown in Figs. 1 and 2 of the drawings two such plates are used and are indicated by the reference numerals 4 and 5.

It will be seen that, as hereinbefore indicated, the few number of parts and the shape and disposition of the parts are such as to bring very few joints in contact with the filtering medium and such joints are not edge joints but occur where flat and comparatively extended surfaces come together. The advantage of this in preserving the filtering medium unchanged will be obvious. However, in order to still further preclude the possibility of evaporation, or other changes due to the atmosphere, one feature of the invention contemplates applying to the external edges of the assembled plates a suitable means for rendering the joints of the plate air-tight. For this purpose a sealing material, such as paraffin or wax, may be used, a layer of such material being indicated in the drawings by the reference numeral 6. It will be necessary after the plates are assembled to hold them firmly together, and in the present embodiment there is provided for this purpose a flexible binder 7 about the edges of the plates, the said binder being of any suitable material, such as heavy paper or fabric. The binder will further serve as a protection for the layer of sealing material 6.

One process of producing a filter such as is included by this invention comprises the taking of a plate of suitable material, such as a glass plate, and removing a portion within such plate to form a receptacle for the filtering medium. The removed portion may extend entirely through the plate or not as desired. The filtering material is then placed within the receptacle in the case where the receiving portion does not extend entirely through the plate. In the case where the entire interior portion of the plate has been cut away, the plate with the cutaway portion is placed upon one of the covering plates and the filtering medium is then placed within the receptacle so formed. The remaining plate is then placed so as to cover the opening, and while the parts are firmly held together to exclude the air, a suitable sealing material is applied to the edges of the three plates and the plates are bound together, as by the flexible strip hereinbefore described.

From all the foregoing it will be understood that a color filter has been provided which realizes the objects of invention and the advantages hereinbefore set forth, together with other objects and advantages.

What I do claim as my invention and desire to secure by Letters Patent, is:

1. A color filter including in combination a single member so shaped as to form an imperforate wall for the receptacle for the filtering medium, and light-transmitting means for completely closing the said receptacle.

2. A color filter including in combination a single member so shaped as to form an imperforate wall about the filtering medium, and opposed light-transmitting surfaces forming with the said member a closed receptacle for the filtering medium.

3. A color filter including in combination a plate having an internal portion thereof cut away to form an imperforate wall for the receptacle for the filtering medium, and a light-transmitting plate on each side of said first-named plate to form the faces of the receptacle.

4. A color filter including in combination a plate having an internal portion thereof cut away to form an imperforate wall for the receptacle for the filtering medium, a light-transmitting plate on each side of said first-named plate to form the faces of the receptacle, and means for rendering the joints of the said plates air-tight.

5. A color filter including in combination a plate of glass having a portion within the plate cut away to form an imperforate wall for the receptacle for the filtering medium, a glass plate on each side of said first-named plate, a sealing material for rendering the edge joints of the said plates air-tight, and a binder placed about the edges of the said plates for holding them together.

6. A color filter including in combination a plate of glass having a portion within the plate cut away to form an imperforate wall for the receptacle for the filtering medium, a glass plate on each side of said first-named plate, and a binder placed about the edges of the said plates for holding them together.

7. A color filter including in combination a non-porous, fluid containing member presenting an imperforate surface to the contained fluid, and a non-porous, light-transmitting member for closing the fluid opening.

8. A color filter including in combination a member so shaped as to form an imperforate wall for the receptacle for the filtering medium, and light-transmitting means for completely closing the said receptacle.

9. A color filter including in combination the filtering fluid, a plate of vitreous material having an internal portion thereof cut away to form an imperforate wall for the receptacle for the filtering fluid, and a vitreous, light-transmitting plate fitting against said first-mentioned plate.

10. A color filter including in combination the filtering fluid, a plate of vitreous material having an internal portion cut away therethrough to form an imperforate wall for the filtering fluid, a vitreous light transmitting plate on each side of said first-mentioned plate to form the light-transmitting faces of the receptacle.

11. A color filter including in combination the filtering fluid, a plate of vitreous material having flat smooth sides and an internal portion cut therethrough to form an imperforate wall for said filtering fluid, said flat, smooth sides extending about said cut out portion, a flat smooth plate of glass on either side of said first-mentioned plate, to form the light transmitting walls of the fluid containing receptacle, the sides of the three plates lying against each other in close contact.

12. A color filter including in combination the filtering fluid, a plate of vitreous material having flat smooth sides and an internal portion cut therethrough to form an imperforate wall for said filtering fluid, said flat, smooth sides extending about said cut out portion, a flat smooth plate of glass on either side of said first-mentioned plate, to form the light-transmitting walls of the fluid containing receptacle, the sides of the three plates lying against each other in close contact, and a sealing material sealing the adjoining edges of the three plates.

13. A color filter including in combination the filtering fluid, a plate of vitreous material having flat, smooth sides and an internal portion cut therethrough to form an imperforate wall for said filtering fluid, said flat, smooth sides extending about said cut out portion, a flat, smooth plate of glass on either side of said first mentioned plate to form the light transmitting walls of the fluid-containing receptacle, the sides of the three plates lying against each other in close contact, and a binding strip folded about and adherent to the edges of said three plates.

14. A color filter including in combination the filtering fluid, a plate of vitreous material having flat, smooth sides and an internal portion cut therethrough to form an imperforate wall for said filtering fluid, said flat, smooth sides extending about said cut out portion, a flat, smooth plate of glass on either side of said first mentioned plate to form the light transmitting walls of the fluid containing receptacle, the sides of the three plates lying against each other in close contact, a sealing material sealing the adjoining edges of the three plates, and a binding strip folded about and adherent to the edges of said three plates.

In testimony whereof, I have signed my name to this specification, in the presence of two subscribing witnesses.

JOSEPH ARTHUR HENRY HATT.

Witnesses:
JOHN D. MORGAN,
CLARA PHILLIPS.

---

Copies of this patent may be obtained for five cents each, by addressing the "Commissioner of Patents, Washington, D. C."